US011792018B1

(12) United States Patent
Yang et al.

(10) Patent No.: US 11,792,018 B1
(45) Date of Patent: Oct. 17, 2023

(54) METHOD FOR CONSTRUCTING EMERGENCY REPORTING SYSTEM OF VEHICLE NETWORKING BASED ON MULTI-SIGNATURES

(71) Applicant: Jinan University, Guangdong (CN)

(72) Inventors: Anjia Yang, Guangzhou (CN); Xiaohu Chen, Guangzhou (CN); Jian Weng, Guangzhou (CN); Tao Li, Guangzhou (CN); Jiasi Weng, Guangzhou (CN); Jianan Liu, Guangzhou (CN)

(73) Assignee: JINAN UNIVERSITY, Guangzhou (CN)

( * ) Notice: Subject to any disclaimer, the term of this patent is extended or adjusted under 35 U.S.C. 154(b) by 0 days.

(21) Appl. No.: 18/150,345

(22) Filed: Jan. 5, 2023

(30) Foreign Application Priority Data

Mar. 23, 2022 (CN) .......................... 202210290875.4

(51) Int. Cl.
*H04L 9/40* (2022.01)
*H04L 9/32* (2006.01)
*H04W 4/44* (2018.01)
*H04L 9/30* (2006.01)
*H04W 4/90* (2018.01)

(52) U.S. Cl.
CPC .......... *H04L 9/3247* (2013.01); *H04L 9/3073* (2013.01); *H04L 9/3242* (2013.01); *H04W 4/44* (2018.02); *H04W 4/90* (2018.02)

(58) Field of Classification Search
CPC ... H04L 9/3247; H04L 9/3073; H04L 9/3242; H04W 4/44; H04W 4/90
See application file for complete search history.

(56) References Cited

U.S. PATENT DOCUMENTS 9,893,825 B1 * 2/2018 Rao .......................... H04W 4/80
10,057,906 B2 * 8/2018 Ko ....................... H04B 17/364
(Continued)

FOREIGN PATENT DOCUMENTS

| CN | 110190957 | 8/2019 |
|---|---|---|
| CN | 114154135 | 3/2022 |

OTHER PUBLICATIONS

Ya-ling, et al. "An Efficient Identity Based Compact Multi-signature From RSA" Journal of Electronics & Information Technology, Sep. 2008, vol. 30, No. 9.

*Primary Examiner* — Ghodrat Jamshidi
(74) *Attorney, Agent, or Firm* — Kaplan Breyer Schwarz, LLP; Stuart H. Mayer

(57) ABSTRACT

Disclosed is a method for constructing an emergency reporting system of vehicle networking based on multi-signatures, which comprises the following steps: initializing an emergency reporting system to obtain a public-private key pair and pre-calculation parameters of a vehicle set; obtaining authentication information of the emergency based on the public-private key pair and the pre-calculation parameters; integrating the authentication information to obtain multi-signatures of the emergency; and completing the system construction by regulating a traffic state based on the multi-signatures. The method realizes the efficient signature generation function of the vehicle with limited computing resources, reduces the communication pressure and computing pressure of roadside units, and may effectively prevent the common rogue key attacks in other schemes.

4 Claims, 1 Drawing Sheet

(56) References Cited

U.S. PATENT DOCUMENTS

| | | | |
|---|---|---|---|
| 10,565,874 B1* | 2/2020 | Lei | H04W 4/46 |
| 11,405,763 B1* | 8/2022 | Bandi | G07C 5/008 |
| 2015/0282065 A1* | 10/2015 | Suzuki | B60R 25/102 |
| | | | 370/311 |
| 2018/0322785 A1* | 11/2018 | Jerichow | G08G 1/162 |
| 2020/0026289 A1* | 1/2020 | Alvarez | G07C 5/085 |
| 2020/0307480 A1* | 10/2020 | Troia | G08G 1/205 |
| 2021/0258751 A1* | 8/2021 | Norton | B60W 50/14 |
| 2021/0314748 A1 | 10/2021 | Cominetti et al. | |
| 2022/0238020 A1* | 7/2022 | Lei | G08G 1/096833 |
| 2022/0292463 A1* | 9/2022 | Brook | H04L 9/32 |
| 2022/0317312 A1* | 10/2022 | Sharma | G01S 19/48 |

* cited by examiner

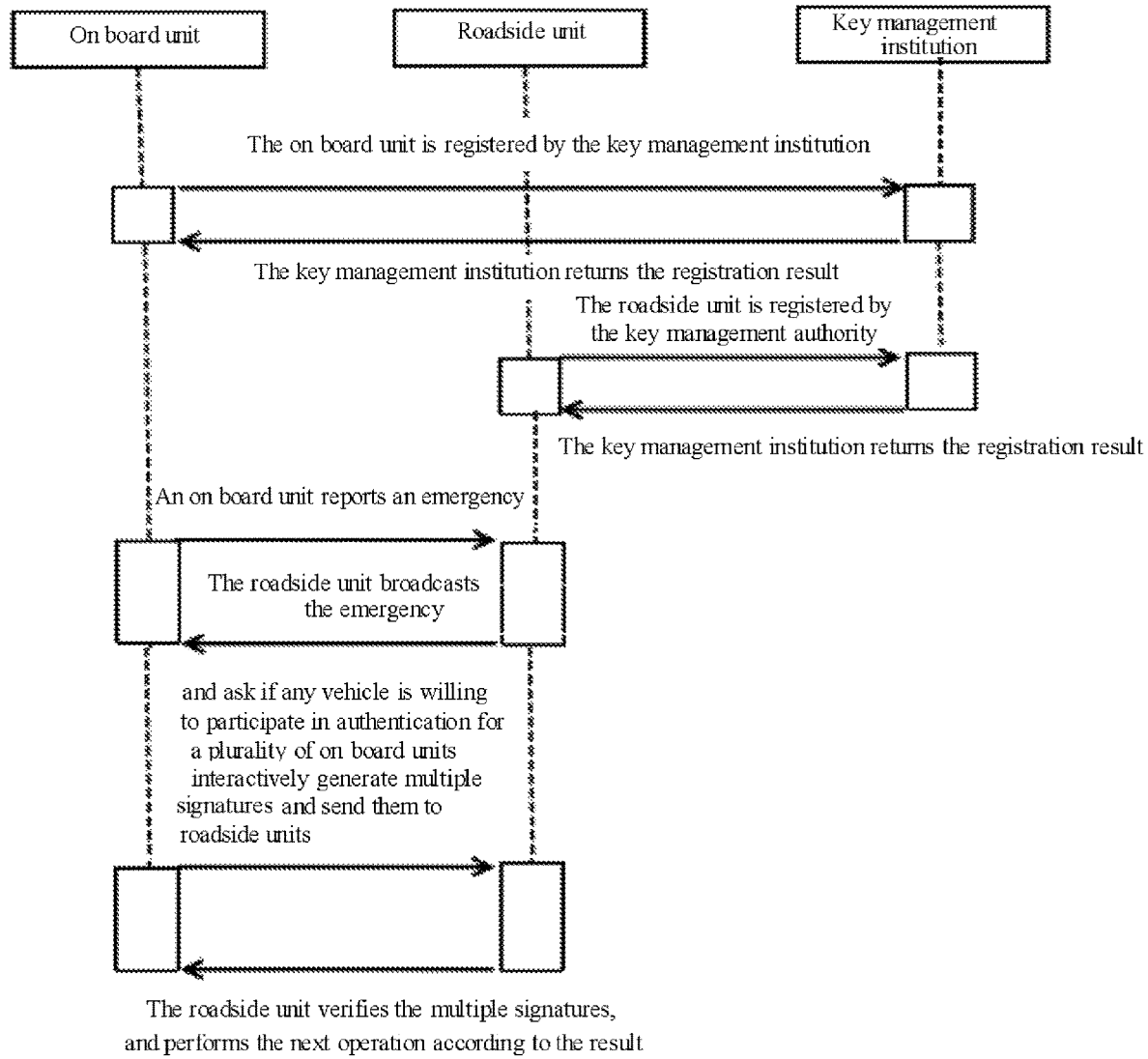

METHOD FOR CONSTRUCTING EMERGENCY REPORTING SYSTEM OF VEHICLE NETWORKING BASED ON MULTI-SIGNATURES

CROSS-REFERENCE TO RELATED APPLICATIONS

This application claims priority to Chinese Patent Application No. 202210290875.4, filed on Mar. 23, 2022, the contents of which are hereby incorporated by reference.

TECHNICAL FIELD

The application relates to the technical field of cyberspace security, and in particular to a method for constructing an emergency reporting system of vehicle networking based on multi-signatures.

BACKGROUND

VANET is a dynamic network based on the availability of vehicles and infrastructure along the road. Through wireless communication of VANET, vehicles may share different kinds of information. When a vehicle witnesses an emergency (such as a traffic accident), the vehicle may send the message and its own signature to the roadside unit through VANET network. After receiving the message and verifying the validity of the signature, the roadside unit broadcasts the message to the vehicles within its communication range, thus achieving the purpose of avoiding secondary accidents. However, the dynamic characteristics of VANET also bring many problems that traditional networks do not have, such as the broadcast storm caused by too many vehicles sending the same emergency message to the roadside unit and the waste of computing resources caused by the slow signature generation of vehicles.

Multi-signatures technology is a popular technology nowadays, which allows a group of signers to generate a common signature on the same message. This signature may be verified by the public key of this group of signers, which means that all the signers in this group approve the message. The length of multi-signatures has nothing to do with the number of signatures, and is always consistent with the length of a single signature, which greatly reduces the information transmission and communication pressure. Since the concept of multi-signatures was put forward, the design of multi-signatures schemes has been fully studied, and the security of these schemes may be restricted to large integer decomposition problem, discrete logarithm problem and lattice difficulty problem.

SUMMARY

In order to solve the problems of broadcast storm caused by traditional methods in the prior art and the waste of computing resources caused by slow signature generation at the vehicle end, the present application provides a method for constructing an emergency reporting system of vehicle networking based on multi-signatures. By combining multi-signatures algorithm with sub-exponent algorithm, the communication pressure and computing pressure of roadside units are reduced, and the common rogue key attack in multi-signaturess is avoided.

In order to achieve the above technical purpose, the present application provides a method for constructing an emergency reporting system of vehicle networking based on multi-signatures, which includes:

S1, initializing an emergency reporting system to obtain a public-private key pair and pre-calculation parameters of a vehicle set;

S2, obtaining authentication information of the emergency based on the public-private key pair and the pre-calculation parameters;

S3, integrating the authentication information to obtain multi-signatures of the emergency; and S4, completing the system construction by regulating a traffic state based on the multi-signatures.

Optionally, the obtaining process of the public-private key pair includes:

the public-private key pair issued by a key management institution after registered in the key management institution, and the public-private key pair includes the public key and the private key.

Optionally, the obtaining process of the pre-calculation parameters includes:

the vehicle set updates the public safety parameters of the emergency reporting system, and pre-calculates the public safety parameters to obtain the pre-calculation parameters.

Optionally, the emergency authentication process includes:

reporting the emergency to a roadside unit, and the roadside unit broadcasts the emergency and the hash value to the vehicle set; the hash value is used to indicate the authentication degree of the vehicle set to the emergency.

Optionally, the obtaining process of the multi-signatures includes:

sending the public key to the roadside unit, setting a public key set, broadcasting and the emergency and the public key set and then signing;

Perform aggregation operation on the signatures to obtain multi-signatures and aggregation variables.

Optionally, the formula of the signature is as follows: $r'_i = (m_i - m')*sk_i*c_i + r_i$, where, $r'_i$ is the signature of the vehicle numbered i, $r_i$, $m_i$ are the randomly selected variables of the vehicle numbered i, m' the hash value of the emergency, $sk_i$ is the private key of the vehicle numbered i, and $c_i$ is the sub-exponent.

Optionally, the formula of the aggregation operation is as follows:

$$R = \sum_{i=1}^{n} r'_i,$$

$$Y = \prod_{i=1}^{n} y_i (i = 1, \ldots, n),$$

where, R are multi-signatures, n is the number of vehicles willing to participate in emergency authentication, $r'_i$ is the signature of the vehicle numbered i, Y is the aggregation variable, and $y_i$ is the variable randomly selected by the vehicle numbered i.

Optionally, the calculation formula of the pre-calculation parameters is as follows: $S_i = g^{r_i}$; $M_i = pk_i^{m_i}$, where, $S_i$ and $M_i$ are pre-calculation parameter, g is a generator of G, and is a public security parameter shared by the whole system, G is a cyclic group of order l, where l is a prime number, M is an emergency, and $pk_i$ is the public key of the vehicle numbered i.

Optionally, the calculation formula of the hash value is m'=h(M), where, m' is the hash value, h is any commonly used hash function and M is an emergency.

The application has the following technical effects.

By combining multi-signatures algorithm with sub-exponent algorithm, the problem of computing resource waste caused by broadcast storm and slow signature generation at vehicle end in traditional methods is improved, the communication pressure and computing pressure of roadside units are reduced, and the common rogue key attack in multi-signatures is avoided.

BRIEF DESCRIPTION OF THE DRAWING

In order to more clearly explain the embodiments of the present application or the technical solutions in the prior art, the following will briefly introduce the drawing that need to be used in the embodiments. Obviously, the drawing in the following description are only some embodiments of the present application. For those of ordinary skill in the art, other drawing may be obtained according to these drawing without any creative labor.

FIG. 1 is a flowchart of a method for constructing an emergency reporting system according to an embodiment of the present application.

DETAILED DESCRIPTION OF THE EMBODIMENTS

The technical solutions in the embodiments of the present application will be clearly and completely described below with reference to the drawing in the embodiments of the present application. Obviously, the described embodiments are only part of the embodiments of the present application, but not all of them. Based on the embodiment of the present application, all other embodiments obtained by ordinary technicians in the field without creative labor are within the scope of the present application.

As shown in FIG. 1, the application discloses a method for constructing an emergency reporting system of vehicle networking based on multi-signatures, which includes the following steps:

S1, initializing the emergency reporting system to obtain the public-private key pairs and pre-calculation parameters of the vehicle set, and the process is as follows:

initializing the emergency reporting system, and when each vehicle connects to the vehicle networking, the vehicle will register with the key management institution through the on board unit to obtain the public-private key pairs issued by the key management institution: $sk_i$, $pk_i=g^{sk_i}$ where $pk_i$ is the public key of the vehicle with number i, $sk_i$ is the private key of the vehicle with number i, g is a generator of G, which is a public security parameter shared by the whole system, and G is a cyclic group of order l, where l is a prime number;

meanwhile, the vehicle updates the public safety parameters of the emergency reporting system, and each vehicle will pre-calculate some of the public safety parameters, including: the vehicle randomly selects variables $r_i$ and $m_i$ from the public safety parameter field in advance, and then pre-calculates the variables through the following formula:

$$S_i=g^{r_i};\ M_i=pk_i^{m_i},$$

where $S_i$ and $M_i$ are pre-calculation parameters, $r_i$ and $m_i$ are the variables selected by the vehicle numbered i, and M is an emergency.

S2, obtaining the authentication information of the emergency based on the public-private key pair and the pre-calculation parameters, and the process is as follows:

when a driver witnesses the accident, he controls the vehicle to report the emergency message to the roadside unit for a simple but unreliable report. Then, the roadside unit receives a report, because the report message comes from a single vehicle, and a single driver may send the wrong emergency message to the roadside unit for subjective or objective reasons. Subjectively, the driver may want to make the roadside unit control the traffic on the road section by fabricating the non-existent accident message, so as to make the travel route smoother; objectively, the driver may be wrong or input the wrong time and place and other factors, resulting in errors in the contents of the emergency, resulting in waste of traffic resources and rescue resources. Therefore, the roadside unit will not believe an emergency until it receives the certification of the emergency from multiple vehicles. In order to receive other authentication messages of the emergency quickly, the roadside unit broadcasts the emergency and the hash value of the emergency to the vehicles in the jurisdiction area, and asks which on board unit is willing to authenticate the emergency message to obtain the authentication information of the emergency. The calculation formula of the hash value is m'=h(M), where h is any commonly used hash function.

S3, integrating the authentication information to obtain multi-signatures of emergencys, and the process is as follows:

after the vehicle receives the emergency and the hash value of the emergency, the vehicle willing to participate in the emergency authentication sends its own public key to the roadside unit, and the roadside unit sets the public key set: L={$pk_i$}(i=1, . . . , n), where n represents the number of vehicles willing to participate in emergency authentication, without losing generality. The roadside unit selects one vehicle N in the vehicle set as a representative to perform multi-signatures aggregation operation, and the roadside unit broadcasts the information and the set public key set by the roadside unit. After receiving the broadcast message, the vehicles willing to participate in emergency authentication calculate the sub-exponent by the sub-exponent algorithm: $c_i$=h(L, $pk_i$), and then signing. The signature formula is: $r'_i=(m_i-m')*sk_i*\ c_i+r_i$;

where h is any commonly used hash function, L is the set of public keys, $pk_i$ is the public key of the vehicle numbered i, $r_i$ and $m_i$ are the variables selected by the vehicle numbered i, $m_i$ is the hash value of the emergency, and $sk_i$ is the private key.

The signature $r'_i$ of each vehicle participating in the emergency authentication, the secret variable $y_i$ calculated before, the small exponent $c_i$ and the public key $pk_i$ of each vehicle willing to participate in the emergency authentication are sent to the vehicle N for aggregation. After the vehicle N collects all the signatures of the vehicle willing to participate in the emergency authentication, the vehicle N performs aggregation operation, and the aggregation operation formula is as follows:

$$R = \sum_{i=1}^{n} r'_i$$

$$Y = \prod_{i=1}^{n} y_i (i = 1, \ldots, n)$$

where R is multi-signatures, n is the number of vehicles willing to participate in emergency authentication, and Y is the aggregation variable.

While waiting for the multi-signatures and aggregation variables sent by the vehicle, the roadside unit calculates the sub-exponent by using the sub-exponent algorithm, and then calculates the aggregation public key: $PK=\Pi^n_{i=1} pk_i^{c_i}$. After receiving the multi-signatures and aggregation variables sent by the vehicle N, the roadside unit performs the multi-signatures verification operation, and the formula is as follows: $g^R * PK^{m'}=Y$, if the two sides of the above equation are equal, the multi-signatures is verified, which means that all the vehicles in the public key set recognize the emergency; if the two sides of the above equation are not equal, the multi-signatures verification fails, and the roadside unit terminates this emergency report.

S4, regulating the traffic state based on multi-signatures to complete the system construction;

the emergency multi-signatures verification is passed, and the roadside unit uses the verified emergency information to regulate the traffic state, including: sending emergency messages to approaching vehicles and warning potential traffic jams, and helping highway management departments to quickly start rescue.

The above shows and describes the basic principle, main features and advantages of the present application. It should be understood by those skilled in the art that the application is not limited by the above-mentioned embodiments. The above-mentioned embodiments and descriptions only illustrate the principles of the application. Without departing from the spirit and scope of the application, there will be various changes and improvements of the application, all of which fall within the scope of the claimed application. The scope of that application is define by the appended claim and their equivalents.

What is claimed is:

1. A method for constructing an emergency reporting system of vehicle networking based on multi-signatures, comprising the following steps:

S1, initializing the emergency reporting system to obtain a public-private key pair and pre-calculation parameters of a vehicle set; an obtaining process of the pre-calculation parameters is as follows: the vehicle set updates public safety parameters of the emergency reporting system, randomly selects variables from the public safety parameters, and pre-calculates the public safety parameters to obtain the pre-calculation parameters;

S2, obtaining authentication information of the emergency based on the public-private key pair and the pre-calculation parameters; the obtaining process of the authentication information of the emergency is as follows: reporting the emergency to a roadside unit; the roadside unit broadcasts the emergency and a hash value to the vehicle set; the hash value is used for indicating an authentication degree of the vehicle set to the emergency;

S3, integrating the authentication information to obtain the multi-signatures of the emergency; the obtaining process of the multi-signatures is as follows: sending a public key to the roadside unit, setting a public key set by the roadside unit, broadcasting the emergency and the public key set and signing; performing an aggregation operation on the signatures to obtain multi-signatures and aggregation variables, wherein the calculation formula of the multi-signatures is as follows:

$$R = \sum_{i=1}^{n} r'_i,$$

wherein n is a number of vehicles willing to participate in emergency authentication; $r'_i$ is a signature of each vehicle participating in emergency authentication;

the formula for calculating the aggregation variables is as follows:

$$Y = \prod_{i=1}^{n} y_i (i = 1, \ldots, n),$$

wherein $y_i$ is a secret variable obtained by the pre-calculation;

the roadside unit broadcasts the information of the vehicle and the public key set set by the roadside unit, and a sub-exponent is calculated by a sub-exponent algorithm after the vehicle willing to participate in the emergency authentication receives the broadcast message as follows: $c_i=h(L, pk_i)$, and then signing, and the signature formula is as follows: $r'_i=(m_i-m')*sk_i*c_i+r_i$, wherein his a common hash function, L is the public key set, $pk_i$ is the public key of a vehicle numbered i, $r_i$ and $m_i$ are the parameter selected by the vehicle numbered i, m' is the hash value of the emergency, $sk_i$ is the private key;

the roadside unit calculates the sub-exponent $c_i$ by using the sub-exponent algorithm while waiting for the vehicle to send the multi-signatures and the aggregation variables, and then calculates an aggregation public key: $PK=\Pi^n_{i=1} pk_i^{c_i}$; the roadside unit performs a multi-signatures verification operation after receiving the multi-signatures and the aggregation variables sent by the vehicle, and the formula of the multi-signatures verification operation is as follows:

$$g^R * PK^{m'} = Y;$$

wherein R is the multi-signatures, Y is the aggregation of $y_i$, and PK is the aggregation public key; and S4, completing the system construction by regulating a traffic state based on the multi-signatures.

2. The method for constructing an emergency reporting system of vehicle networking based on multi-signatures according to claim 1, wherein the obtaining process of the public-private key pairs comprises:

the public-private key pair issued by a key management institution after registered in the key management institution, and the public-private key pair comprises the public key and the private key.

3. The method for constructing an emergency reporting system of vehicle networking based on multi-signatures according to claim 1, wherein a calculation formula of the pre-calculation parameters is: $S_i=g^{r_i}$; $M_i=pk_i^{m_i}$;

wherein, $S_i$ and $M_i$ are the pre-calculation parameters, q is a generator of G, and is a public security parameter shared by the whole system; G is a cyclic group of order l, wherein l is a prime number, $r_i$, $m_i$ are parameters variables randomly selected by the vehicle numbered i, m' is a hash value of the emergency, M is the emergency, and $pk_i$ is the public key of the vehicle numbered i.

4. The method for constructing an emergency reporting system of vehicle networking based on multi-signatures according to claim 1, wherein a calculation formula of the hash value is m'=h(M);
wherein m' is the hash value, h is a commonly used hash function, and M is the emergency.

* * * * *